Aug. 14, 1956  S. E. REA  2,759,082
METHOD OF HEADING A HOLLOW RIVET
Filed July 29, 1952  2 Sheets-Sheet 1
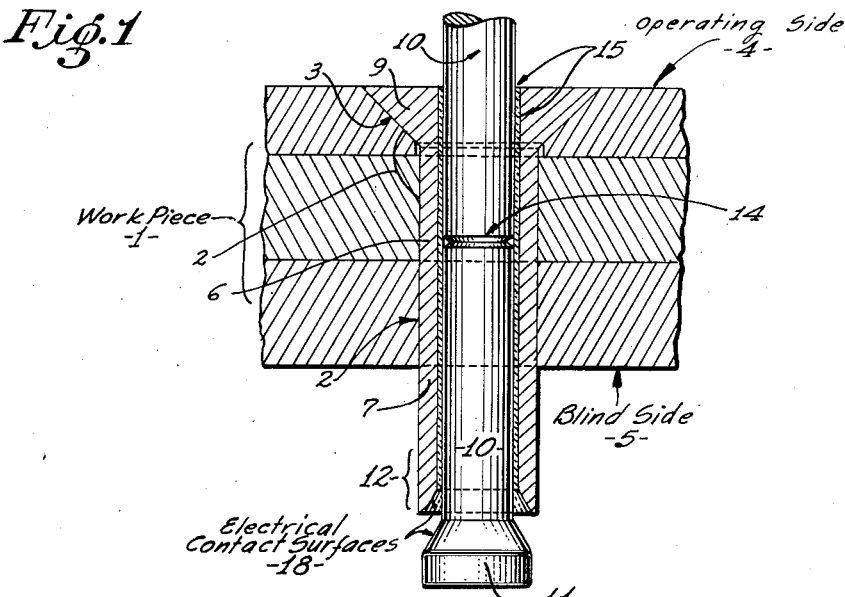
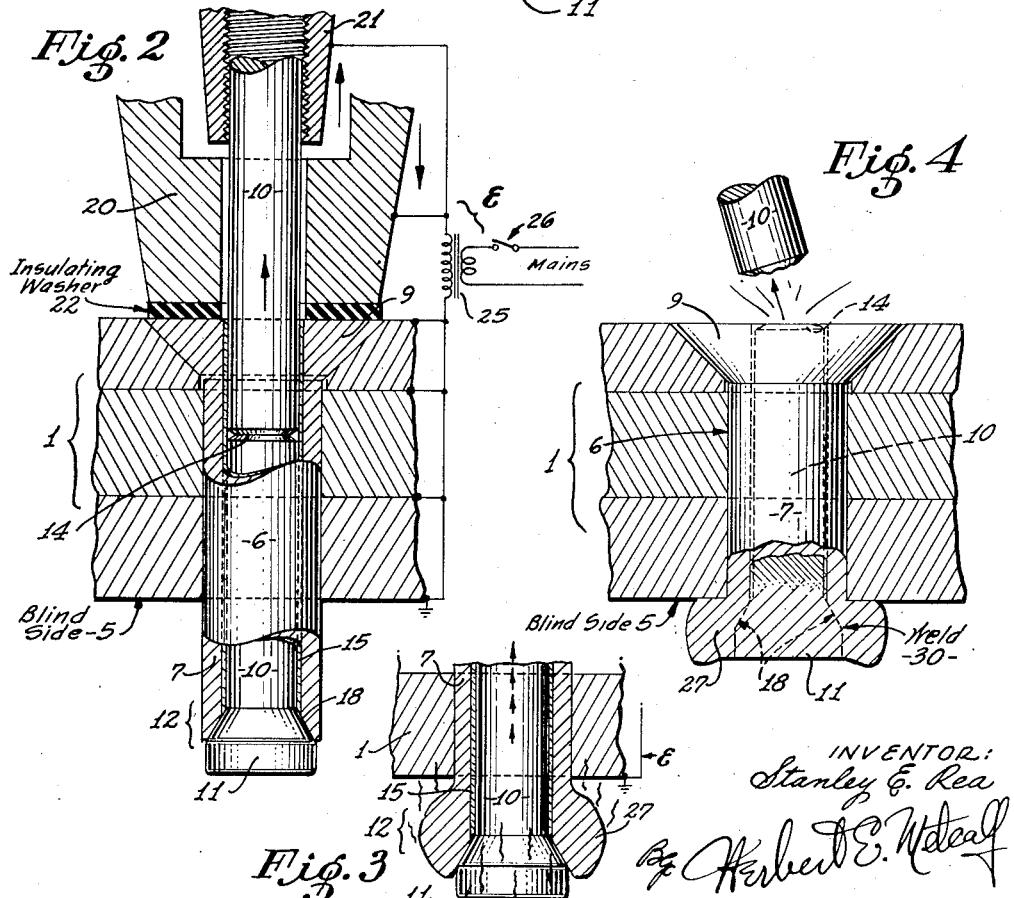
INVENTOR:
Stanley E. Rea
By Herbert E. Metcalf
HIS PATENT ATTORNEY Aug. 14, 1956  S. E. REA  2,759,082
METHOD OF HEADING A HOLLOW RIVET
Filed July 29, 1952  2 Sheets-Sheet 2
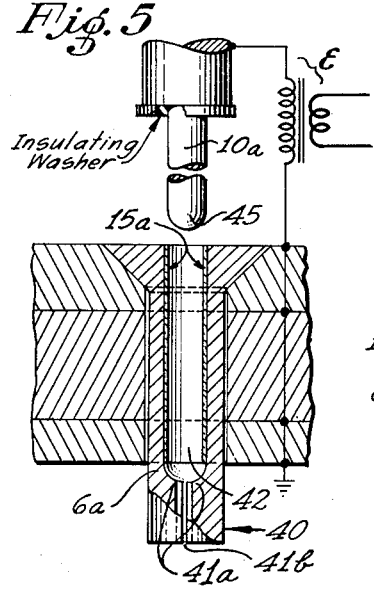
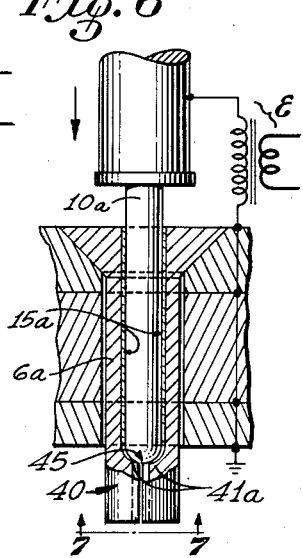
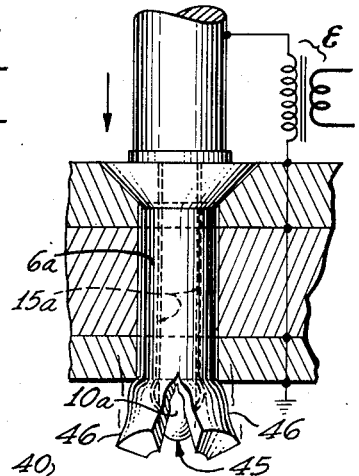
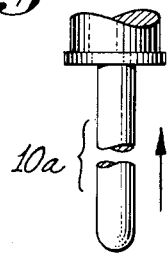
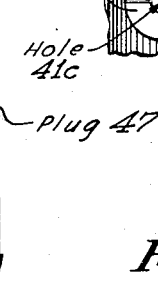
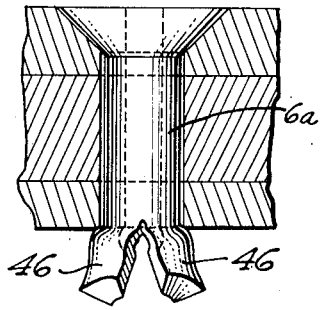
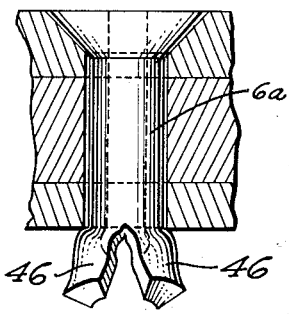
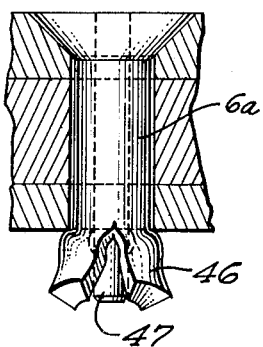
INVENTOR:
Stanley E. Rea
By Herbert E. Metcalf
HIS PATENT ATTORNEY

United States Patent Office 2,759,082
Patented Aug. 14, 1956

2,759,082

METHOD OF HEADING A HOLLOW RIVET

Stanley E. Rea, Redondo Beach, Calif., assignor to Northrop Aircraft, Inc., Hawthorne, Calif., a corporation of California Application July 29, 1952, Serial No. 301,576

1 Claim. (Cl. 219—2)

The present invention relates to blind rivets.
Among the objects of the present invention are:
To provide a novel method of installing a blind rivet;
To provide a method of hot forming the blind end of a blind rivet;
To provide a rivet that can be hot formed on one end, from the other end thereof;
To provide a method of electrically hot forming the blind end of a blind rivet;
To provide a means and method of heading the blind end of a blind rivet to give the head improved strength characteristics;
To provide a blind rivet of high strength materials; and to provide a means and method of heading the blind end of a rivet formed from materials that cannot be satisfactorily cold worked.

In brief, the present invention provides for the use of a hollow metal rivet member headed at one end. A mandrel member of metal having a higher softening point than the material of the rivet is also provided, being sized to pass through the interior of the hollow rivet. A thin layer of insulation is used to electrically separate the rivet and mandrel except at the inner end where an electrical contact is made by an overlap of the two members; the overlap being within the diameter of the rivet body so that the rivet can be inserted through a hole in the work piece. After the rivet and mandrel have been inserted in the workpiece hole, electrical current is applied between the mandrel and rivet so that the blind end of the rivet is electrically heated adjacent the contact of the rivet and mandrel. As the material of the rivet is softened, relative movement is made between the mandrel and rivet so that due to the overlap, the softened material is forced laterally around the hole opening to form a rivet retaining head. The mandrel can either be left in place or withdrawn. If left in place, the area in electrical contact can then be flash welded.

By using heat to form the inner head of the rivet, the rivet can be made of metals that cannot be cold headed by pressure alone, resulting in much stronger blind rivets than could otherwise be installed.

Other objects and advantages of the present invention will be apparent from a more detailed description of the invention as illustrated in the drawings in which:

Figures 1 to 4 are longitudinal sectional views through one preferred type of the rivet of the present invention showing sequential steps during installation in a workpiece.

Figures 5 to 11 are similar views of a modification of the present invention using a removable mandrel.

Referring first to Figures 1 to 4, a workpiece 1 is provided with a hollow rivet bore 2 and an external counter bore 3 on the operating side 4. The opposite side 5 of the workpiece is termed the blind side as the rivet of the present invention is capable of being completely installed from the operating side 4 alone.

A hollow rivet 6 having a body 7 of uniform diameter and a head 9 shaped to fit counter bore 3 is inserted in the workpiece as shown in Figure 1. In this modification, an internal pull mandrel 10 is inserted in the interior of the hollow rivet 6; this pull mandrel having an enlarged inner end 11 overlapping the rivet inner end 12 which, as is customary in blind rivets, projects beyond the blind side 5 of the workpiece. Mandrel 10 is also provided with a break-off groove 14 and is long enough to project well beyond the head 9 of the rivet so that it can be gripped by a pulling tool as is well known in the art. The mandrel is made of a metal having a higher softening temperature than that of the rivet.

A thin layer of insulation 15 is provided between the mandrel 10 and the rivet 6, and in this case is applied as a coating around the interior of the rivet 6, before mandrel 10 is inserted therein. However, no insulation is provided on surfaces 18 where the rivet body 7 and mandrel overlap, so that when mandrel 10 is pulled outwardly toward head 9, the surfaces 18 will be in electrical contact.

The usual type of pull tool is provided with a head retaining portion 20 positioned to hold the rivet head 9 in the workpiece 1, and a mandrel gripping portion 21 attachable to the mandrel 10 as shown diagrammatically in Figure 2. An insulating washer 22 electrically separates the pull tool from the rivet and workpiece. After tool 20—21 has drawn the mandrel 10 to a position where firm electrical contact is made between surfaces 18, an electrical current is applied between the electrically insulated mandrel 10, the rivet body 7, and the workpiece 1, the latter of which are all in electrical contact as indicated by a circuit diagram E which includes the usual transformer 25 and switch 26. This first applied current is regulated either in time or in amplitude to be a heating, not a welding, current so that the inner end 12 of the rivet is softened by heat, the mandrel 10 remaining hard because of its higher softening point. A heavier pull is then applied between rivet and mandrel until, by virtue of the overlap of the mandrel 10 and rivet 6 end, the softened hot metal of the rivet end is forced laterally around the bore 2 opening to form an interior rivet head 27 as shown partly formed in Figure 3 and fully formed in Figure 4.

After the interior head 27 is formed, it is preferred to flash weld the surfaces 18 which are still in electrical contact. This weld 30 is provided, as is well known in the art, by applying a heavier current to the contacting surfaces from circuit E, or by applying for a longer period of time the same current as used during the heating only. This weld prevents mandrel 10 from falling out of the rivet. Mandrel 10 is then broken at groove 14 as is customary in the art.

As pulling tools embodying parts 20 and 21 shown in Figure 2 can be electrically operated; the heating, pulling and welding steps can be readily sequenced by means well known in the art.

It will be noted that in the rivet 6 shown in Figures 1 to 4 inclusive, the mandrel 10 overlaps the blind rivet end 12. In Figures 5 to 11, I have shown a modification of the rivet of the present invention wherein the material of the blind rivet end overlaps the mandrel.

In this modification, hollow rivet 6a has one one end 40 thereof split longitudinally into four parts 41 by narrow slots 41b, each part 41 having a portion 41a projecting into the interior of the rivet 6a around a coaxial bore 41c, the outer diameter of the rivet being uniform as shown. In this case, mandrel 10a is of uniform diameter with a rounded end 45 shaped to contact the projecting portions 41a in the interior of end 40 as shown in Figures 5 and 6. This mandrel can be made of tungsten or molybdenum for example to prevent softening thereof at a temperature where the rivet material will soften. The rivet interior 42 is in this case also coated with electrical insulation 15a except where contact of the rounded end 45 of mandrel is made with the four parts 41a of the interior of end 40 of the rivet.

After this contact has been made, a heating current from circuit E is passed between the rounded end 45 of the mandrel 10a and the four parts 41 of the rivet end 40, the latter parts 41 softening so that when the mandrel 10a is forced inwardly as by driving, or with a tool, for example the softened material will be moved laterally and expanded to form a blind head 46 as shown in Figure 8. The mandrel 10a is preferably withdrawn as shown in Figure 9, and if it is desired to close the rivet interior 42, a slightly oversize plug 47 is driven into the rivet hollow 42 as shown in Figures 10 and 11. This plug 47 also strengthens blind head 46.

The coatings of electrical insulation 15 and 15a can be relatively thin, as both the heating and welding voltages can be relatively low, 3 to 10 volts, for example. This coating can also be placed on either mandrels 10 and 10a, or on the interior of rivets 6 and 6a, as described and preferred. Hard silicone plastics have been found satisfactory, as well as the type of insulation used on the enameled wire familiar in the art.

The hot forming of the blind end of the rivet made possible by the rivet assembly of the present invention makes it possible to head the blind ends of mild steel rivets for example, thereby providing a blind rivet having a relatively high shear resistance. Titanium rivets can be used, and have the advantage that the interior blind head, upon cooling, has physical characteristics substantially the same as the unheated portion of the rivet.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claim.

What is claimed is:

The method of heading the unheaded end of a hollow metal rivet having a body of substantially uniform outer diameter, and a head on one end of said body, which comprises: inserting a metal mandrel having a softening temperature higher than that of said rivet into the hollow of said rivet, making electrical contact between said mandrel and the unheaded end of said rivet by means of mechanical interference between these latter parts, and insulating the remainder of the mandrel from the rivet, passing an electrical heating current through said mandrel into said unheaded end of said rivet through said contact area to soften said unheaded end, moving said mandrel longitudinally of the rivet against said interference to effect deformation of the unheaded rivet end while hot to produce a head evenly formed around the longitudinal axis of the rivet in any position of said axis, and passing a continued electrical current of greater effect through said contact area to weld said metal mandrel in place.

References Cited in the file of this patent

UNITED STATES PATENTS

| | | |
|---|---|---|
| 1,122,280 | Kempshall | Dec. 29, 1914 |
| 1,330,800 | Gravell | Feb. 17, 1920 |
| 1,413,998 | Templeton | Apr. 25, 1922 |
| 1,587,445 | Thomson | June 1, 1926 |
| 1,643,771 | Iseman | Sept. 27, 1927 |
| 1,876,811 | Whitworth | Sept. 13, 1932 |
| 2,038,189 | Morris | Apr. 21, 1936 |
| 2,293,894 | Fether | Aug. 25, 1942 |
| 2,344,128 | Cherry et al. | Mar. 14, 1944 |
| 2,465,144 | Wyatt | Mar. 22, 1949 |
| 2,536,353 | Cooper | Jan. 2, 1951 |